Oct. 27, 1964    H. L. LANSING    3,154,250
ELECTRICALLY INSULATED RAIL JOINT
Filed Feb. 1, 1961    2 Sheets-Sheet 1

INVENTOR
HORACE L. LANSING

Oct. 27, 1964 H. L. LANSING 3,154,250
ELECTRICALLY INSULATED RAIL JOINT
Filed Feb. 1, 1961 2 Sheets-Sheet 2

INVENTOR
HORACE L. LANSING.
BY 
ATTORNEY

United States Patent Office 3,154,250
Patented Oct. 27, 1964

3,154,250
ELECTRICALLY INSULATED RAIL JOINT
Horace L. Lansing, Rutherford, N.J., assignor to Poor & Company, Chicago, Ill., a corporation of Delaware
Filed Feb. 1, 1961, Ser. No. 86,449
3 Claims. (Cl. 238—152)

This invention relates to electrically insulated rail joints and more particularly to a new shape and form of electrical insulation.

Heretofore, it has been customary to use so-called hard fiber, molded into cross sectional form to fit either the head or base of a rail joint bar. This insulation, although originally very hard and to a degree substantially waterproof, nevertheless, because of the extraordinary punishment that it takes under rolling loads which are manifested by both pressure and abrasion, requires frequent renewal. After a relatively short period of time, this type of insulating material tends to swell under conditions of moisture resulting from weather changes, and, under the great compressive forces imposed thereon, frequently splits or separates completely at the points where load stresses are concentrated, thereby not only impairing but ultimately destroying the insulating value of the entire joint. This is particularly true where insulation is applied to continuous joints, namely that type of joint whose base or foot portion embraces both the upper and lower surfaces of the base of the rail. Continuous joints provide the most substantial type of rail joint because they offer three points of support, namely at the underside of the rail head, and both the top and bottom faces of the rail base, as compared with insulated joints wherein insulation is provided only at the upper side of the bar head and where the foot or toe of the bar engages the upper face of the base of the rail.

Accordingly, the present invention has primarily in view insulation units as an article of manufacture and which in addition to being dimensionally stable are provided with metal sheathing to provide greater longevity to the insulated joint. That is to say, the present invention contemplates a laminated type of insulation unit which may be prefabricated at the mill and distributed as a unit for application to insulated rail joint at the time the joints are installed either originally or for repair purposes.

A further object of the invention is to provide a laminated rail base embracing insulated unit wherein the metallic reinforcement is located only at the load bearing areas of the unit while the bight or bend connecting the load bearing areas is without reinforcement thereby rendering it feasible to flex the unit in a manner to enable it to be readily applied to the base flange of the rail.

With the above and other objects in view which will be more readily apparent as the nature of the invention is better understood, the same consists in the novel construction, combination and arrangement of parts, hereinafter more fully described, illustrated and claimed.

A preferred and practical embodiment of the invention is shown in the accompanying drawings, in which.

Similar reference characters designate corresponding parts throughout the several figures of the drawing.

Figure 1:
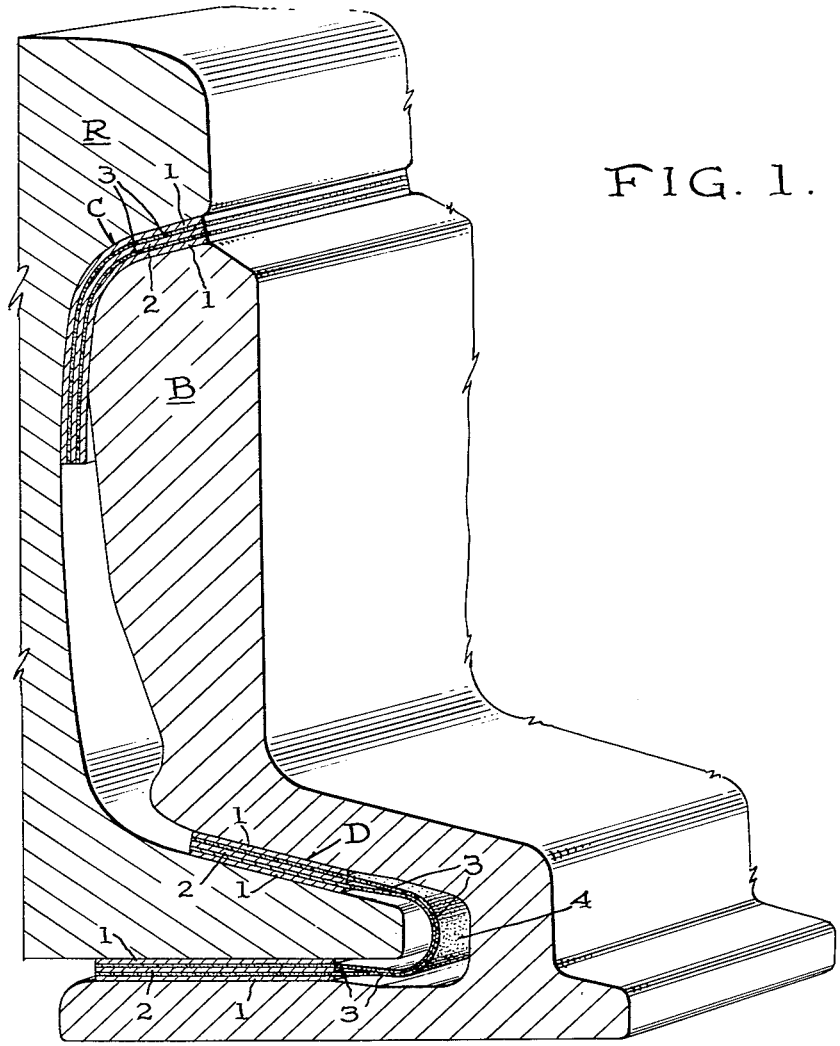
FIGURE 1 is a diagrammatic isometric perspective view showing a half section of the rail and one bar applied thereto with the laminated insualtion units of the present invention in place.
Figure 2:
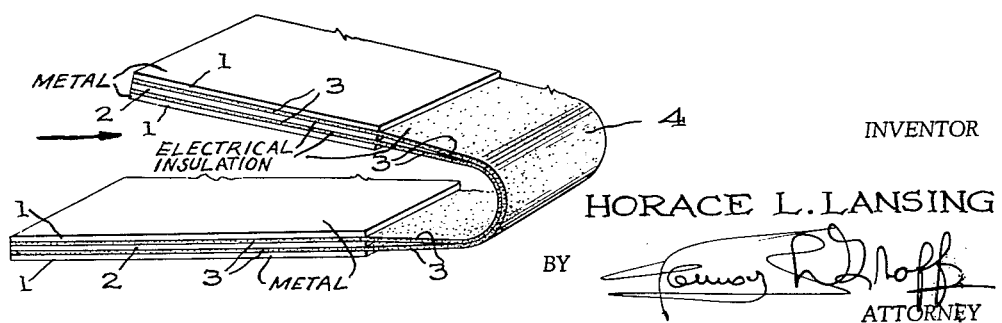
FIGURE 2 is a fragmentary enlarged perspective view of the base insulation showing the metal load bearing surfaces haivng a preset plastic or adhesive material sandwiched therebetween.
Figure 3:
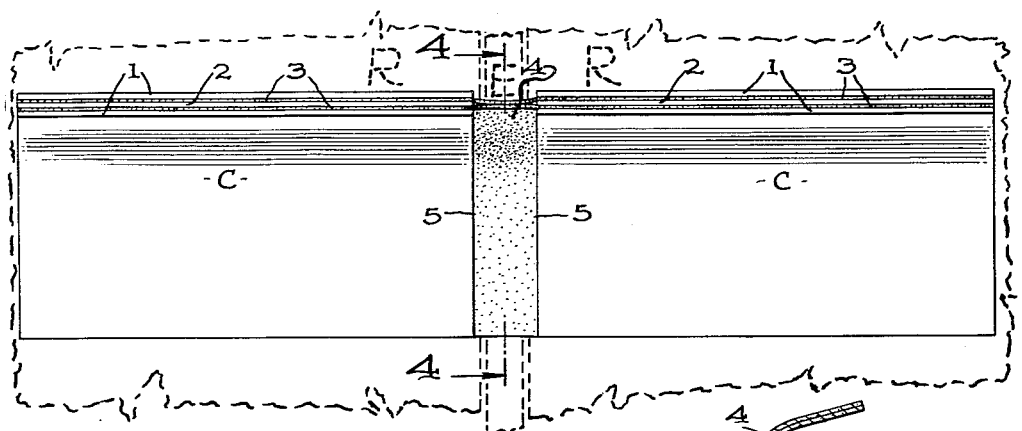
FIGURE 3 is a side elevation of the head insulation in solid lines, the side bar being omitted, and parts of the rail ends and the customary end post therebetween, which are related to the insulation during use, being shown in dark lines.
Figure 4:
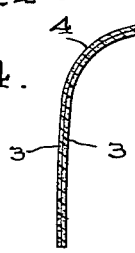
FIGURE 4 is a cross section of the head insulation alone taken on the line 4—4 of FIGURE 3 with the adjacent rail ends, end post and bar not shown.
Figure 5:
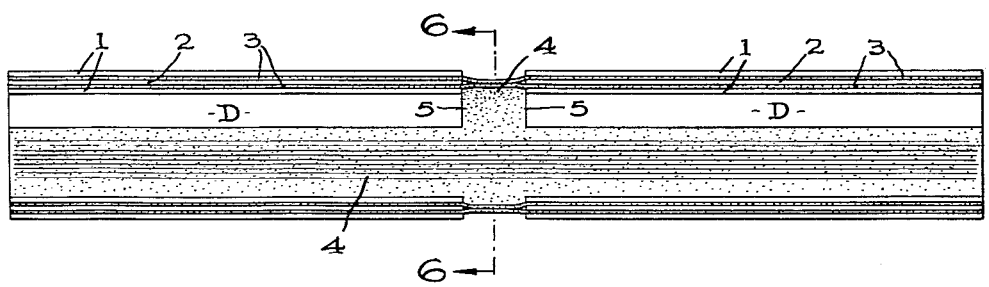
FIGURE 5 is a side elevation of the base insulation alone, that is without the adjacent side bar end post and rail ends, and viewed in the direction of the arrow in FIGURE 2.
Figure 6:
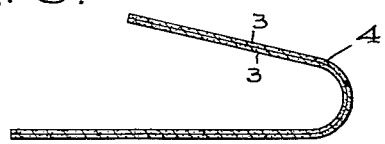
FIGURE 6 is a cross section taken on line 6—6 of FIG. 5.
Figure 6:

Referring to FIGURE 1, it will be seen that the rail R is used in connection with continuous joint bars B having an insulating head piece unit C and a base piece insulating unit D. A conventional insulating end post is present between the rail ends, as shown in FIGURE 3.

Both units C and D are formed of medially spaced sets exposed outer metal sheath portions 1 and a third or intermediate metal layer 2 all bonded together by continuous intermediate insulating layers 3 of settable plastic or adhesive, such, for example, as an epoxy resin, which serves to securely hold the exposed inner and outer metallic laminae 1—1 and the intermediate layer 2 together, and, at the same time, produce the desired insulating or non-conducting effect between them.

The result of forming a unit in the manner fashioned above is to provide continuous insulating layers 3 which are dimensionally stable throughout and not subject to deterioration due to changes of temperature and moisture, while being protected from the relative abrasive effect between the loading surfaces of the rail and the bar. Also, these layers of insulating material unite to serve as a web 4, as shown to not only connect the sections of the inner and outer metal portions 1—1 and 2 but to provide a medial insulating gap between them and which gap spans the gap between the rail ends at the location of the usual end post.

Referring to the unit D, it will be seen that the same is doubled upon itself to be of substantially U-shaped formation in cross-section to provide arms for embracing the base flange of the rail, with the inner and outer metal sheath portion 1 having a direct contact with the related faces of the bar and rail while the insulating bonding material 3 sandwiched therebetween continues laterally outward beyond the outer edge portions of the metal sections to form the continuous web 4 and provide a flexible non-metallic connector across the gap between the rail ends thereby greatly facilitating the base insulation assembly during manufacture and also permitting its proper handling after manufacture, during shipment, and at the time of installation.

A single forming die is used for making the head pieces. The filler or carrier for the epoxy or like resin, for example, either fiber glass or like foraminous base material, will be cut in lengths equal to that of the joint and approximately two to three inches in width. The metal pieces are of the same width as the filler but cut into lengths one-quarter inch shorter than the half length of the joint. It will thus be seen that the metal will be arranged in the resinous material so that there will be the gap 5 at the center of the piece of approximately one-half inch. The die will be heated to effect close control over the curing of the resin.

The base pieces are made in a die wherein the two ends of the insulation material will be formed together, and connected by web 4. The filler material is as long as the joint and of sufficient length to allow it to reach from the outside of the top laminae to the outside of the bottom laminae. The die is made with a long throat to allow the epoxy material to lie flat during assembly and the formation of the connecting webs 4. The most feasible method is to form either the top or bottom laminae first and then clamp it tight in a die closure while thereafter forming the bottom portion, at the same time forming the connecting web. Curing times and temperatures will depend on the material being used as the adhesive, but the temperature range will be in the neighborhood of 250° F. for a period of approximately one-half hour.

From the foregoing it will now be seen that the present invention contemplates sections of laminated rail joint bar insulation adapted for either the head or foot of the bar and which can be made in units including a core of the bar and which can be made in units including a core of settable plastic insulating material which serves to bond the protective outer metal layers together and provides the additional advantage of connecting the laminated insulation and metallic portions together, by an arcuate portion of the plastic or adhesive matter alone, which latter has a sufficient degree of transverse flexibility to permit the insulation unit to adjust itself to the related surfaces of the bar.

I claim:

1. As an article of manufacture,
   a non-slip load-bearing plate-like electrical insulation accessory unit, ready for application between the related inside surface of a single joint bar and the two related side surfaces of axially aligned and adjacently related rail ends and across the gap between the related rail ends, for providing an electrically insulated joint in a railway track,
   said unit formed of at least two similar sets of longitudinally spaced interior and exterior metal layers extending from each end of the unit towards but short of the middle, whereby a longitudinal space is formed therebetween,
   intermediate interleaving layers of cured thermosetting electrical insulation material between the metal layers and permanently bonding said interior and exterior metal layers of each set together,
   and connective layers of thermosetting electrical insulating material only, structurally bridging the longitudinal space between the similar sets of metal layers and bonded insulating material,
   whereby, each metal layer within each set is electrically insulated from each other metal layer in the same set, and one set is electrically insulated from the other similar set.

2. As an article of manufacture,
   a non-slip load-bearing plate-like base flange electrical insulation accessory unit,
   ready for application between the top and bottom surfaces of the bases of axially aligned and adjacently related rail ends and the gap between said related rail ends, and the two related inside base surfaces of a single joint bar, for providing an electrically insulated joint in a railway track,
   said unit formed by at least a pair of spaced rectangular layers of cured and stable thermosetting electrical insulation material of the same horizontal length as a joint bar and folded upon itself into a two-legged sidewise-lying substantially U-shaped formation,
   said unit also including spaced interior and exterior metal layers of lesser dimensions than the electrical insulation layers and located cross sectionally between and exterior of the electrical insulation layers and permanently bonded to the insulation,
   said metal layers being so arranged as to provide four similar corner sets of interleaved metal layers and insulation layers in which said insulation layers provide bridging structure therebetween forming the sole physical connection thereof.

3. As an article of manufacture for use in a rail joint between a metal joint bar and a metal rail,
   a laminated member therebetween comprising an intermediate metal sheet and two outer similar sized sheets, and interleaved electrical insulation members of a cured thermosetting material,
   the interleaved electrical insulation members being between and permanently bonded to the intermediate and outer metal sheets, the outer metal sheets being adapted to be in direct contact with the joint bar and rail,
   the interleaved electrical insulation members being extended laterally beyond a side of each of the metal sheets and being continuous therebetween and folded in said continuous portions into a substantially U-shaped form to provide arms for embracing a base flange of a rail,
   whereby each metal layer of the laminated member is electrically insulated from each other layer thereof and each arm is electrically insulated from the other arm.

References Cited in the file of this patent

UNITED STATES PATENTS

| 1,386,863 | Harrington | Aug. 9, 1921 |
| 2,809,130 | Rappaport | Oct. 8, 1957 |
| 3,006,553 | Greer | Oct. 31, 1961 |

FOREIGN PATENTS

| 508,195 | Canada | Dec. 14, 1954 |
| 726,310 | Great Britain | Mar. 16, 1955 |